(12) United States Patent
Trinks

(10) Patent No.: US 11,820,692 B2
(45) Date of Patent: Nov. 21, 2023

(54) INLAY, SLEEVE SHAFT WITH INLAY AND REFRACTORY TUBE WITH SLEEVE SHAFT

(71) Applicant: Schott AG, Mainz (DE)

(72) Inventor: Volker Trinks, Mitterteich (DE)

(73) Assignee: Schott AG, Heidenheim (DE)

( * ) Notice: Subject to any disclaimer, the term of this patent is extended or adjusted under 35 U.S.C. 154(b) by 86 days.

(21) Appl. No.: 17/334,893

(22) Filed: May 31, 2021

(65) Prior Publication Data
US 2021/0371320 A1 Dec. 2, 2021

(30) Foreign Application Priority Data
May 29, 2020 (EP) .................................. 20177554

(51) Int. Cl.
*C03B 17/04* (2006.01)
(52) U.S. Cl.
CPC .................. *C03B 17/04* (2013.01)
(58) Field of Classification Search
CPC ...................................... C03B 17/04
USPC ......................................... 65/187
See application file for complete search history.

(56) References Cited

U.S. PATENT DOCUMENTS

| | | |
|---|---|---|
| 2018/0362382 A1 | 12/2018 | Hoshiba |
| 2018/0362384 A1 * | 12/2018 | Hoshiba ................ C03B 17/025 |
| 2020/0079675 A1 * | 3/2020 | Wada ...................... C03B 17/04 |
| 2020/0087190 A1 * | 3/2020 | Wada ...................... C03B 17/04 |

OTHER PUBLICATIONS

Extended European Search Report dated Sep. 28, 2021 for European Patent Application No. 21176778.5 (10 pages).

* cited by examiner

*Primary Examiner* — Christopher M Raabe
(74) *Attorney, Agent, or Firm* — Taylor IP, P.C.

(57) ABSTRACT

An inlay for a sleeve shaft for collecting particles originating from a material of the sleeve shaft at least in part, at least one fluid being flowable through the sleeve shaft along an axial direction which is parallel to a main extension of the sleeve shaft, the inlay includes at least one first wall section and the inlay is inserted or insertable at least in part into the sleeve shaft such that at least one part of the first wall section has a radial distance from at least one first area of an inner surface of the sleeve shaft, and, hence, that the inlay together with the first area of the inner surface of the sleeve shaft encloses at least one volume domain, which volume domain is limited in the axial direction by a limiting element.

18 Claims, 4 Drawing Sheets

INLAY, SLEEVE SHAFT WITH INLAY AND REFRACTORY TUBE WITH SLEEVE SHAFT

CROSS REFERENCE TO RELATED APPLICATIONS

This application claims priority to European Patent Application No. 20177554.1, filed on May 29, 2020, which is incorporated in its entirety herein by reference.

BACKGROUND OF THE INVENTION

1. Field of the Invention

The present invention relates to an inlay for a sleeve shaft, a sleeve shaft having such an inlay, and a refractory tube with such a sleeve shaft inserted.

2. Description of the Related Art

In the state of the art, during a mechanical glass tube drawing process such as the Danner process, a fluid flows in a controlled manner through a carrier which carries a refractory tube. The refractory tube in turn provides a surface area onto which molten glass runs, which molten glass then is shaped into a glass tube strand in the shaping zone arranged at one end of the refractory tube.

Based on the chosen parameters of the fluid, such as volume flow rate and pressure, the speed of pulling of the glass tube strand from the refractory tube, and the temperature regime in the shaping zone, the geometric parameters of the produced glass tube strand can be influenced.

The fluid, which can be a gaseous medium such as air, flows through the carrier to the shaping zone. The carrier might be in the form of a sleeve shaft, which is for example a hollow shaft made of steel. Often, the refractory tube has temperatures of, for example, 1100 degrees C. to 1200 degrees C., which in turn heats the carrier since it is arranged within the refractory tube.

Due to high temperatures at the sleeve shaft, the steel material of the sleeve shaft undergoes a cinder-corrosion process in the presence of oxygen. This leads to particles originating from the material of the sleeve shaft in form of cinder particles present in the lumen enclosed by the sleeve shaft. While the fluid flow through the carrier typically is insufficient for whirling the particles within the lumen, the particles are transported along the inner surface of the sleeve shaft to the shaping zone mediated by the fluid flow, gravity (since the refractory tube, hence, the carrier, might be inclined), and the rotational movement of the sleeve shaft.

In the shaping zone, the particles then might be in contact with the inner surface of the glass material of the glass tube strand and contaminate it while it is a viscous fluid. After the glass material has contact with the particles and subsequently has hardened, the particles are permanently confined on the inner surface of the glass tube strand.

Since the particles cannot be removed from the glass tube strand in subsequent process steps, contaminated products are rejected by inspection systems of production process, thus reducing the production yield.

Conventionally, it has been proposed to cover the inner surface of the sleeve shaft with noble metals, ceramics or other corrosion protection coatings of appropriate temperature resistance in order to prevent the occurrence of cinder particles in the lumen enclosed by the sleeve shaft. Other attempts have been directed to using inert gas as fluid, or even using completely metal-free, especially iron-free, sleeve shafts, e.g. made of ceramic or even glass.

However, the results have not been satisfying or the measures are complex, come along with high costs, or are hard to implement.

Also, further processing of the inner surface of the sleeve shaft for the purpose of minimizing the corrosion process, for example by sandblasting of the inner surface, did not yield a significant reduction of the particles.

Furthermore, it was proposed that fluid filters are positioned in the end section of the sleeve shaft and the entire fluid directed through such filters. However, it turned out that the fluid flow dynamics are disturbed by such filters which in turn adversely affect the geometry and quality of the glass tube strand. Furthermore, such filters are subject to clogging which requires regular maintenance of the system and replacement of the filters. This, however, leads to enormous downtimes of the production, hence, to increased costs.

What is needed in the art is a way of producing glass tubes that allows a reduction of the contamination of the glass tube strand by particles in an easy and cost-efficient manner or even preventing such contaminations completely.

SUMMARY OF THE INVENTION

In some exemplary embodiments provided according to the present invention, an inlay for a sleeve shaft for collecting particles originating from a material of the sleeve shaft at least in part, at least one fluid being flowable through the sleeve shaft along an axial direction which is parallel to a main extension of the sleeve shaft. The inlay includes at least one first wall section and the inlay is inserted or insertable at least in part into the sleeve shaft such that at least one part of the first wall section has a radial distance from at least one first area of an inner surface of the sleeve shaft, and, hence, that the inlay together with the first area of the inner surface of the sleeve shaft encloses at least one volume domain, which volume domain is limited in the axial direction by a limiting element comprised by the inlay.

In some exemplary embodiments provided according to the present invention, a sleeve shaft includes at least one inlay for collecting particles originating from material of the sleeve shaft at least in part, the at least one fluid being flowable through the sleeve shaft along an axial direction which is parallel to a main extension of the sleeve shaft. The at least one inlay including at least one first wall section and the at least one inlay is inserted at least in part into the sleeve shaft such that at least one part of the first wall section has a radial distance from at least one first area of an inner surface of the sleeve shaft, and, hence, that the at least one inlay together with the first area of the inner surface of the sleeve shaft encloses at least one volume domain, which volume domain is limited in the axial direction by a limiting element comprised by the at least one inlay.

In some exemplary embodiments provided according to the present invention, a refractory tube for use in a glass tube drawing process includes: at least one outer surface including at least one of platinum or at least one platinum alloy; and a sleeve shaft inserted into the refractory tube. The sleeve shaft includes at least one inlay for collecting particles originating from material of the sleeve shaft at least in part, at least one fluid being flowable through the sleeve shaft along an axial direction which is parallel to a main extension of the sleeve shaft, the at least one inlay including at least one first wall section and the at least one inlay is inserted at least in part into the sleeve shaft such that at least one part of the first wall section has a radial distance from at least one first area of an inner surface of the sleeve shaft, and, hence, that the at least one inlay together with the first area of the inner surface of the sleeve shaft encloses at least one volume domain, which volume domain is limited in the axial direction by a limiting element comprised by the at least one inlay.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
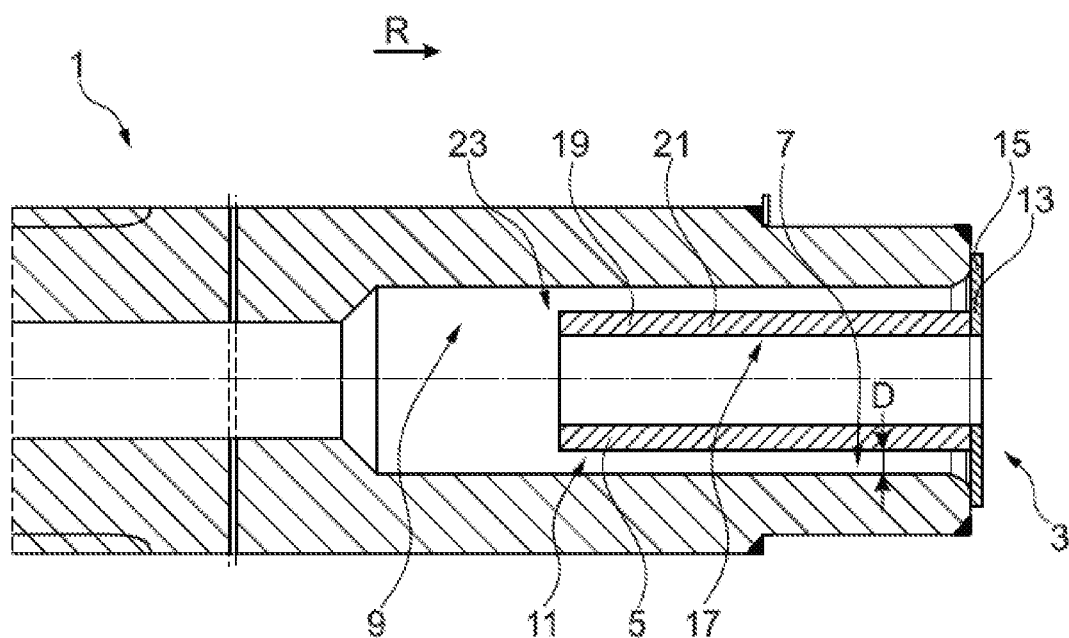
FIG. 1 illustrates a cross-sectional view of an exemplary embodiment of a sleeve shaft with an inlay provided according to the present invention.

Exemplary embodiments provided according to the present invention provide an inlay for a sleeve shaft for collecting particles originating from the material of the sleeve shaft at least in part. At least one fluid can flow through the sleeve shaft along an axial direction which is parallel to the main extension of the sleeve shaft. The inlay comprises at least one first wall section and the inlay is or can be inserted at least in part into the sleeve shaft such that at least one part of the first wall section has a radial distance from at least one first area of the inner surface of the sleeve shaft, and, hence, that the inlay together with the first area of the inner surface of the sleeve shaft encloses at least one volume domain, which volume domain is limited in the axial direction by a limiting element comprised by the inlay.

Exemplary embodiments provided according to the present invention are based on the surprising finding that due to the nature of the particles and the given general conditions, the particles are typically moving closely along the inner surface of the sleeve shaft rather than being distributed across the entire lumen enclosed by the sleeve shaft. Thus, it is possible to prevent the contact of these particles with the glass material, preventing a contamination of the glass material. By providing a volume domain within the sleeve shaft where respective moving particles, such as cinder particles originating from the material of the sleeve shaft, can be collected, the particles are prevented from moving to the shaping zone.

By using the disclosed inlay, the volume domain can be provided in a very straight forward and cost-efficient manner. The inlay itself can be designed to be inserted into the sleeve shaft of a refractory tube quickly and easily. This makes it easy to retrofit nearly any existing refractory tubes with an inlay according to the present invention in an efficient and inexpensive manner. Particularly, neither the entire sleeve shaft has to be replaced nor any covers have to be applied at places within the sleeve shaft which are usually difficult to access. Both would be highly complex and would require removing the sleeve shaft from the refractory tube with subsequent external processing. Hence, exemplary embodiments provided according to the present invention can reduce downtime of the production process.

Since the inlay is much smaller than the sleeve shaft, it is possible to use materials for the inlay or corrosion-preventing coatings for the inlay's inner surfaces, which previously have been excluded from use with the sleeve shaft due to their high costs. For example, the inlay might comprise 5-15% by weight, such as 8-11% by weight, of Fe.

In some embodiments, the inlay has an axial length of between 100 mm and 350 mm, such as of between 150 and 250 mm, of between 180 mm and 220 mm, or of 200 mm.

The inlay has the further advantage that it can be designed such that it provides a sufficiently large volume for trapping particles so that the inlay can remain within the sleeve shaft during a production process for several years without the need to remove the collected particles from the volume domain.

In various tests conducted and as confirmed by monitoring the glass tube strand in production, it has been proven that the inlay neither affects the fluid flow within the sleeve shaft or in the shaping zone nor does it affect the quality or geometric properties of the glass tube line.

The volume domain is limited in radial direction by the first wall section and the first area of the inner surface of the sleeve shaft and in axial direction by the limiting element.

Exemplary embodiments provided according to the present invention, thus, provide a cheap and powerful solution for preventing the contamination of the glass tube strand with particles, such as cinder particles originating from the material of the sleeve shaft.

In some embodiments, it might alternatively or in addition be provided that the particles, which are moving at least in part mediated by the fluid flow and/or gravity along the inner surface of the sleeve shaft along the first axial direction, reach the volume domain and get trapped, hence, are prevented from moving further along the axial direction.

In some embodiments, it might alternatively or in addition be provided that the inlay comprises at least one zone of cylindrical form and the first shell of at least one first section of the cylindrical zone comprises the first wall section. The first section may comprise at least one first end section of the inlay.

If the inlay comprises a zone of cylindrical form it can be easily inserted within the sleeve shaft, which typically provides an enclosed volume, i.e. lumen, of cylindrical form. For example, the inlay can then be arranged concentrically within the sleeve shaft in an easy manner. At the same time, the first shell (of a first section) of that zone can provide the first wall section which leads to a compact design.

If the first section is an end section of the inlay, it is possible to provide the volume domain far inside the sleeve shaft, hence, a large volume domain may be provided.

In some embodiments, it might alternatively or in addition be provided that the second shell of at least one second section of the cylindrical zone, which is different to the first section of the cylindrical zone, comprises at least one second wall section, where the first outer diameter of the first wall section is smaller than the second outer diameter of the second wall section. The second section may comprise at least one second end section of the inlay and/or the second section may follow after the first section along the axial direction, especially the second end section of the inlay being at the opposite end of the inlay than the first end section of the inlay.

If the second shell of a second section of the cylindrical zone provides the second wall section, the inlay can be fitted to the inner geometries of the sleeve shaft.

In some embodiments, it might alternatively or in addition be provided that the limiting element is formed and/or arranged in at least one end section of the first wall section. The limiting element may be in one piece with the first wall section and/or the end section of the first wall section may be facing away from the first end section of the inlay.

Arranging the limiting element at the end section of the first wall section allows defining a definite volume domain.

In some embodiments, it might alternatively or in addition be provided that the limiting element is formed by at least one transition from the first wall section to the second wall section. The transition may be designed in at least one cross sectional plane in the form of at least one step and/or in the form of at least one arc segment.

If the transition between the first and second wall sections is used as limiting element, a compact design and an inherent, hence, efficient realization of the limiting element is possible.

In some embodiments, it might alternatively or in addition be provided that the inlay comprises at least one fastener for arranging the inlay at the sleeve shaft, at least one distant element and/or at least one stop element. The stop element may be designed in form of at least one collar, designed at least in part in one piece with the limiting element, designed at least in part in one piece with the second wall section, and/or provided in at least one end section of the inlay, especially at the end section of the inlay opposite the first wall section.

Providing one or more fasteners allows securing the inlay safely at the sleeve shaft. This improves security. A stop element allows for a comfortable and safe installation of the inlay within the sleeve shaft because the stop element efficiently prevents inserting the inlay too deep into the sleeve shaft.

A distant element allows that the inlay is held in a safe and/or concentric manner within the sleeve shaft.

In some embodiments, it might alternatively or in addition be provided that the inlay is or can be connected with the sleeve shaft by welding, in a positive locking manner and/or frictional locking manner, and/or that the volume domain is at least in part in form of at least one ring volume.

If the inlay is suitable for being connected (or even if it is connected) to the sleeve shaft by welding, in a positive locking manner and/or in a frictional locking manner, a safe connection can be provided between the inlay and the sleeve shaft.

The inlay, in some embodiments, might comprise fasteners. Fasteners allow arranging the inlay at a sleeve shaft securely. Especially some fasteners allow reversible release of the inlay. This allows removing particles from the volume domain very easily.

A positive locking here means connections that are created by the interlocking of at least two connecting members. As a result, the connecting members cannot loosen even if the force transmission is interrupted or not present at all. In other words, in a positive locking connection, one connecting member is in the way of the other. Under operational load, compressive forces act in a normal direction, i.e. perpendicular to the surfaces of the connecting members. Such "blocking" occurs in at least one direction. If a second homogeneous pair of surfaces is arranged opposite, the opposite direction is also blocked. If the pair consists of two coaxial cylindrical surfaces, positive locking exists in all directions of the plane perpendicular to the cylinder axis.

A frictional locking here means connections that require a normal force on the surfaces to be connected. Their mutual displacement is prevented as long as the normal force caused by the static friction is not exceeded by a tangential force. The normal force or frictional connection is eliminated and the surfaces slip with respect to each other, if the tangential load force is greater than the static friction force.

A ring volume can be used because it provides rotational symmetry of the system and, hence, a stable operation of the system.

In some embodiments, it might alternatively or in addition be provided that the particles comprise oxidation products of the sleeve shaft material, cinder particles and/or corrosion particles, which particles may be created by the reaction of steel, especially chromium-nickel steel, together with oxygen at temperatures of between 1000 to 1500 degrees C.

Here, the particles might alternatively or in addition also comprise particles contained in the fluid.

In some embodiments, it might alternatively or in addition be provided that the inlay does not substantially affect the fluid flow within the sleeve shaft negatively and/or does not substantially affect the shape, the quality or the geometric properties of the produced glass tube strand.

If the inlay does not affect the fluid flow, the production process of the glass tube strand is not adversely affected. Hence, the inlay does not affect the quality of the glass tube strand in a negative manner.

In some exemplary embodiments provided according to the present invention, a sleeve shaft with at least one inlay is provided for collecting particles originating from the material of the sleeve shaft at least in par. At least one fluid can flow through the sleeve shaft along an axial direction which is parallel to the main extension of the sleeve shaft. The inlay comprises at least one first wall section and the inlay is inserted at least in part into the sleeve shaft such that at least one part of the first wall section has a radial distance from at least one first area of the inner surface of the sleeve shaft, and, hence, that the inlay together with the first area of the inner surface of the sleeve shaft encloses at least one volume domain, which volume domain is limited in the axial direction by a limiting element comprised by the inlay. The sleeve shaft and the inlay may be arranged in a coaxial manner.

If a sleeve shaft is provided with a respective inlay, the advantages of the inlay as described previously can be applied without any further efforts.

In some embodiments, it might alternatively or in addition be provided that the sleeve shaft comprises at least one steel, such as chromium-nickel steel and/or 2.4633 steel, as material.

The proposed materials have been proven to provide a sleeve shaft of good quality and stability even under rough environment conditions, such as heat.

In some embodiments, the sleeve shaft comprises a material comprising: 24-26% by weight of Cr, 8-11% by weight of Fe, 2% by weight of Al and 55-66% by weight of Ni.

In some embodiments, the sleeve shaft comprises a material comprising: 30-35% by weight of Ni, 19-23% by weight of Cr and 39-41% by weight of Fe.

In some embodiments, it might alternatively or in addition be provided that the inlay is arranged at the sleeve shaft by at least one fastener, especially comprised by the inlay, and/or wherein the inlay is connected with the sleeve shaft in a welded manner, in a positive locking manner and/or frictional locking manner.

A fastener allows securely arranging the inlay at the sleeve shaft. Especially some fasteners allow reversible release of the inlay. This allows removing particles from the volume domain very easily.

If a welded connection is chosen a very reliable connection is provided.

Further, reference is made to the definition provided previously for the terms "positive locking" and "frictional locking", which apply here as well.

In some embodiments, it might alternatively or in addition be provided that the inlay comprises at least one zone of cylindrical form and the shell of at least one section of the cylindrically zone, especially the second section, comprises at least one second wall section, the second wall section contacting at least one area of the inner surface of the sleeve.

This arrangement allows provision of the volume domain in an efficient and easy manner. Furthermore, the contact area allows for a more reliable connection between the inlay and the sleeve shaft, which increases safety.

In some embodiments, it might alternatively or in addition be provided that the first area of the inner surface of the sleeve shaft is an inner surface of a first section of the sleeve shaft, the first section having an inner diameter which is larger than the inner diameter of a further section of the sleeve shaft, which further section of the sleeve shaft follows the first section of the sleeve shaft in a direction antiparallel to the axial direction.

It has been found that if the fluid flows through the sleeve shaft from a section of smaller inner diameter into a section of larger inner diameter, it is possible that the fluid flow near the inner surface of the sleeve shaft is deflected so to say into the shadow area of the volume enclosed by the sleeve shaft in the section with larger inner diameter. This is because a radial velocity seems to be created by the transition from smaller to larger inner diameter.

This way, particles which are close to the inner surface of the sleeve shaft are directed closer towards the trapping volume enclosed between inlay and sleeve shaft. Furthermore, it has been noted that the absolute fluid velocity in that shadow area is significantly reduced so that the time the particles have in order to get trapped is increased. This, in turn, increases the possibility that the particles actually get trapped.

In some embodiments, it might alternatively or in addition be provided: that the ratio of the inner diameter of the further section and the inner diameter of the first section is (a) 1.1 or larger, such as 1.15 or larger, 1.2 or larger, 1.3 or larger, 1.4 or larger, 1.5 or larger, 1.6 or larger, 1.8 or larger, 2.0 or larger, 2.5 or larger, 3.0 or larger, 3.5 or larger, 4.0 or larger, 4.5 or larger, (b) 5 or smaller, such as 4 or smaller, 3.5 or smaller, 3 or smaller, 2.8 or smaller, 2.5 or smaller, 2.0 or smaller, 1.7 or smaller, 1.5 or smaller, 1.3 or smaller, and/or (c) between 1.1 and 5.0, such as between 1.2 and 4.0, between 1.2 and 3.0, between 1.2 and 2.5, between 1.2 and 2.0, or between 1.2 and 1.7; and/or that the transition from the further section to the first section is designed in the form of a step-like transition and/or in the form of a tapered transition section, especially having a conical shape and/or being arranged between the further section and the first section, and wherein the tapered transition section may have in an axial direction a length of (a) 1 mm or more, such as 3 mm or more, 5 mm or more, 10 mm or more, 20 mm or more, 30 mm or more, 40 mm or more, 50 mm or more, 60 mm or more, or 70 or more, (b) 100 mm or less, such as 90 mm or less, 80 mm or less, 70 mm or less, 60 mm or less, 50 mm or less, 40 mm or less, 30 mm or less, 20 mm or less, 10 mm or less, or 5 mm or less, and/or (c) between 1 mm and 100 mm, such as between 2 mm and 90 mm, between 2 mm and 70 mm, between 2 mm and 50 mm, between 3 mm and 30 mm, or between 5 mm and 20 mm.

A transition, such as a tapered transition, has been proven to provide an improved radial velocity so as to improve trapping of the particles.

In some exemplary embodiments provided according to the present invention, a refractory tube, especially for use in a glass tube drawing process, into which refractory tube a sleeve shaft as previously described is inserted, especially in a coaxial manner. The refractory tube may have at least one outer surface, which outer surface comprises platinum and/or at least one platinum alloy.

If a refractory tube is provided with a respective sleeve shaft, the advantages of the sleeve shaft as described previously can be applied without any further efforts.

An outer surface of the refractory tube which comprises platinum and/or at least one platinum alloy provides a heat resistant surface. This may be useful for the contact surface where the molten glass runs onto the refractory tube.

In some embodiments, it might alternatively or in addition be provided that a total axial length L of the inlay, a heat resistance parameter γ of at least parts of the material of the inlay and an axial distance d between the position where molten glass runs onto the refractory tube and the end of the refractory tube, from which end the glass tube is drawn, meet the condition: L≤15 γd, wherein the heat resistance parameter γ is defined as $$\gamma = 1 - \frac{E(300°\ C.) - E(1300°\ C.)}{E(300°\ C.)}$$

with E(T) being the Young's modulus of a metal material comprised by the inlay at temperature T, and wherein the position where molten glass runs onto the refractory tube is defined as the center of the axial extension of the shell of the refractory tube.

In some embodiments, the total axial length L of the inlay meet the condition: L≤13 γd. In some embodiments, the total axial length L of the inlay meet the condition: L≤10 γd. In some embodiments, the total axial length L of the inlay meet the condition: L≤8 γd. In some embodiments, the total axial length L of the inlay meet the condition L≤6 γd. In some embodiments, the total axial length L of the inlay meet the condition L≤5 γd. In some embodiments, the total axial length L of the inlay meet the condition L≤4 γd. In some embodiments, the total axial length L of the inlay meet the condition L≤2γd. In some embodiments, the total axial length L of the inlay meet the condition L≤2 γd. In some embodiments, the total axial length L of the inlay meet the condition L≤γd.

Parts of the inlay which are located closer to the position where molten glass runs onto the refractory tube (or its shell) are exposed to increased heat compared to parts of the inlay which are farther away from that particular position. With increasing heat, also the number of particles originating from the inlay material itself may be increased. Hence, making the inlay longer comes with the positive effect of e.g., providing more space for collecting particles. But it may come with the negative effect of increased production of particles once the inlay is inserted in the sleeve shaft of the refractory tube because the additional particles may lead to further contamination of the fluid flowing through the sleeve shaft.

It has been found that a beneficial maximal total axial length of the inlay can be determined if a heat resistance of the inlay's material is taken into account. Surprisingly, a heat resistance can be expressed as a simple parameter basically based on the Young's modulus of the metal material of the inlay.

The solution is based on the finding that the Young's modulus typically decreases with increasing temperatures and, thus, provides a good basis for assessing the quality of the metal material in the context of heat exposure.

It has been further found in that respect that a robust overall estimation can be made if the Young's modulus at the temperatures of 1300 ° C. and 300 ° C. are considered. This is because the respective temperature range can be regarded as roughly covering the temperatures of the molten glass during its presence on the refractory tube.

If the total axial length of the inlay is chosen so as to meet the provided condition, a beneficial compromise between the increased trapping volume on the one hand and the increased particle production rate on the other hand can be achieved.

Exemplary Features

Below, exemplary features of the inlay and the sleeve shaft, respectively, provided according to the present invention are disclosed. The features may be employed alone or in any combination.

Inlay

In some embodiments, the inlay has a total axial length of between 50 mm and 400 mm, such as of between 80 mm and 350 mm, of between 80 mm and 300 mm, of between 80 mm and 250 mm, of between 100 mm and 200 mm, or of between 100 mm and 180 mm.

In some embodiments, the inlay has a total axial length of 50 mm or more, such as of 80 mm or more, of 100 mm or more, of 150 mm or more, or of 170 mm or more.

In some embodiments the inlay has a total axial length of 400 mm or less, such as of 350 mm or less, of 250 mm or less, of 200 mm or less, of 180 mm or less, of 150 mm or less, of 130 mm or less, of 110 mm or less, or of 90 mm or less.

For example, the inlay may have a total axial length of 100 mm, 177 mm or 180 mm.

In some embodiments, the inner diameter of the inlay is constant.

In some embodiments, at least one inner diameter of the inlay has a value of between 10 mm and 50 mm, such as of between 20 mm and 40 mm or of between 30 mm and 40 mm.

In some embodiments, the at least one inner diameter of the inlay has a value of 10 mm or more, such as of 15 mm or more, of 20 mm or more, of 25 mm or more, of 30 mm or more, of 35 mm or more, or of 40 mm or more.

In some embodiments, the at least one inner diameter of the inlay has a value of 50 mm or less, such as of 45 mm or less, of 40 mm or less, of 35 mm or less, of 30 mm or less, of 25 mm or less, of 20 mm or less, or of 15 mm or less.

For example, at least one inner diameter of the inlay may have a value of 20 mm or 35 mm.

The inner surface of the inlay may be the surface of the zone of cylindrical form of the inlay.

In some embodiments, the inner surface of the inlay has a value of between 5000 $mm^2$ and 25000 $mm^2$, such as of between 5000 $mm^2$ and 10000 $mm^2$ or 15000 $mm^2$ and 25000 $mm^2$, or of between 19000 $mm^2$ and 23000 $mm^2$.

In some embodiments, the inner surface of the inlay has a value of 5000 $mm^2$ or more, such as of 10000 $mm^2$ or more, of 15000 $mm^2$ or more, of 19000 $mm^2$ or more, of 21000 $mm^2$ or more, or of 23000 $mm^2$ or more.

In some embodiments, the inner surface of the inlay has a value of 25000 $mm^2$ or less, such as of 23000 $mm^2$ or less, of 21000 $mm^2$ or less, of 20000 $mm^2$ or less, of 18000 $mm^2$ or less, of 15000 $mm^2$ or less, of 12000 $mm^2$ or less, or of 10000 $mm^2$ or less.

For example, the inner surface of the inlay may have a value of 6280 $mm^2$, 19782 $mm^2$, 19452.3 $mm^2$, or 22608 $mm^2$.

For example, it might be provided to define a ratio of the value of the inner surface of the sleeve shaft and the value of the inner surface of the inlay.

In some embodiments, the ratio has a value of between 5 and 100, such as of between 10 and 20, of between 15 and 30, of between 30 and 50, of between 40 and 50, of between 50 and 60, of between 60 and 70, of between 70 and 80, of between 80 and 90 or of between 90 and 100.

In some embodiments, the ratio has a value of 5 or more, such as of 10 or more, of 15 or more, of 20 or more, of 30 or more, of 40 or more, of 50 or more, of 60 or more, of 70 or more, or of 80 or more.

In some embodiments, the ratio has a value of 100 or less, such as of 80 or less, of 70 or less, of 50 or less, of 40 or less, of 30 or less, of 25 or less, of 20 or less, of 15 or less, of 10 or less, of 8 or less, of 5 or less, or of 3 or less.

For example, the ratio may have a value of 14, 20, 22, 24 or 68.

Sleeve Shaft

In some embodiments, the sleeve shaft has a total axial length of between 2000 mm and 4000 mm, such as of between 2200 mm and 3500 mm, of between 2400 mm and 3100 mm, or of between 2600 mm and 3000 mm.

In some embodiments, the sleeve shaft has a total axial length of 2000 mm or more, such as of 2200 mm or more, of 2400 mm or more, of 2600 mm or more, or of 2800 mm or more.

In some embodiments, the sleeve shaft has a total axial length of 4000 mm or less, such as of 3500 mm or less, of 3300 mm or less, of 3100 mm or less, of 2800 mm or less, of 2500 mm or less, of 2300 mm or less, or of 2100 mm or less.

For example, the sleeve shaft may have a total axial length of 3000 mm, 3020 mm, 2460 mm, 2770 mm, 2970 mm, 2460 mm or 2600 mm.

For example, the first area of the inner surface of the sleeve shaft is a surface of a section of the sleeve shaft of constant inner diameter. This may be the respective diameter of the bore within the sleeve shaft where the inlay is or can be inserted.

The respective section of the sleeve shaft of constant inner diameter may have an axial length of between 1800 mm and 2200 mm, such as of between 1900 mm and 2100 mm, such as 2000 mm.

In some embodiments, the constant inner diameter has a value of between 30 mm and 180 mm, such as of between 30 mm and 130 mm, of between 50 mm and 100 mm, of between 30 mm and 60 mm, of between 35 mm and 50 mm, or of between 40 mm and 50 mm.

In some embodiments, the constant inner diameter has a value of 30 mm or more, such as of 35 mm or more, of 40 mm or more, of 45 mm or more, of 50 mm or more, of 55 mm or more, of 60 mm or more, of 70 mm or more, of 80 mm or more, of 90 mm or more, of 100 mm or more, or of 150 mm or more.

In some embodiments, the constant inner diameter has a value of 180 mm or less, such as of 150 mm or less, of 130 mm or less, of 100 mm or less, of 90 mm or less, of 80 mm or less, of 75 mm or less, of 70 mm or less, of 65 mm or less, of 60 mm or less, of 55 mm or less, of 50 mm or less, or of 45 mm or less.

For example, the constant inner diameter may have a value of 40 mm, 50 mm or 80.5 mm.

The inner surface of the sleeve shaft may be the inner surface of the bore of the sleeve shaft.

In some embodiments, the inner surface of the sleeve shaft has a value of between 250000 mm$^2$ and 500000 mm$^2$, such as of between 300000 mm$^2$ and 500000 mm$^2$, of between 350000 mm$^2$ and 450000 mm$^2$, or of between 370000 mm$^2$ and 430000 mm$^2$.

In some embodiments, the inner surface of the sleeve shaft has a value of 250000 mm$^2$ or more, such as of 300000 mm$^2$ or more, of 320000 mm$^2$ or more, of 350000 mm$^2$ or more, of 380000 mm$^2$ or more, of 420000 mm$^2$ or more, or of 450000 mm$^2$ or more.

In some embodiments, the inner surface of the sleeve shaft has a value of 500000 mm$^2$ or less, such as of 480000 mm$^2$ or less, of 450000 mm$^2$ or less, of 400000 mm$^2$ or less, of 380000 mm$^2$ or less, of 350000 mm$^2$ or less, of 320000 mm$^2$ or less, or of 300000 mm$^2$ or less.

For example, the inner surface of the sleeve shaft may have a value of 423900 mm$^2$, 474140 mm$^2$, 386220 mm$^2$, 434890 mm$^2$, 466290 mm$^2$, 308976 mm$^2$, or 326560 mm$^2$.

Further Exemplary Features

In some embodiments, the ratio of the total axial length of the sleeve shaft and the total axial length of the inlay is between 2 and 80, such as between 5 and 60, between 5 and 50, between 10 and 35, between 10 and 20, or between 25 and 35.

In some embodiments, the ratio of the constant inner diameter of the sleeve shaft and the at least one inner diameter of the inlay is between 2 and 100, such as between 5 and 80, between 10 and 75, between 20 and 50, or between 30 and 40.

The main part of the particles may be created in the hottest area of the refractory tube at the level of the glass run-up (glass temp. approx. 1200-1300° C.). However, an inlay which would protrude into the sleeve shaft bore into this area would be exposed to extreme production of particles from its inner surface (at these temperatures, this can hardly be influenced by the choice of steel grade for the scale stop).

The temperature of the sleeve shaft in the head area (glass temperature approx. 900° C.), on the other hand, is much lower. It is even the location with the lowest possible temperature inside the sleeve shaft and thus also with the lowest possible rate of particle production of the inner surface of the scale stop.

Therefore, it might be beneficial to choose the total axial length of the inlay comparatively small. For example, the inlay may not reach the area (within the sleeve shaft) where the hot glass runs onto the outer surface of the refractory tube. For example, the inlay may be arranged in the head portion of the refractory tube.

Due to the temperature profile inside the sleeve shaft along its axis, an inlay projecting further into the sleeve shaft bore might be subject to bending (deterioration of the air flow conditions) or at least be under tension (which is undesirable) due to the different thermal expansion of different components.

The inlay may be designed such as to be not conical.

Referring now to the drawings, FIG. 1 shows a cross-sectional view of a sleeve shaft 1 with an inlay 3 provided according to the present invention for collecting particles originating from the material of the sleeve shaft 1 at least in part.

At least one fluid can flow through the sleeve shaft 1 along an axial direction R which is parallel to the main extension of the sleeve shaft 1.

The inlay 3 comprises a first wall section 5.

The inlay 3 is inserted in part into the sleeve shaft 1 such, that at least one part of the first wall section 5 has a radial distance D from at least one first area 7 of the inner surface 9 of the sleeve shaft 1. Hence, the inlay 3 together with the first area 7 of the inner surface 9 of the sleeve shaft 1 encloses a volume domain 11. The volume domain 11 is limited in the axial direction R by a limiting element 13 comprised by the inlay 3. The volume domain 11 is at least in part in form of a ring volume. The limiting element 13 is arranged at an end section of the first wall section 5.

The inlay 3 further comprises a stop element 15. The stop element 15 allows easy arrangement of the inlay 3 within the sleeve shaft 1. The stop element 15 is designed in one piece with the limiting element 13.

It is apparent from FIG. 1 that the inlay 3 comprises a zone 17 of cylindrical form and the first shell 19 of a first section 21 of the cylindrical zone 17 comprises the first wall section 5. In FIG. 1, the first section 21 is identical to the first wall section 5, which, however, is not required in general. The first section 21 comprises a first end section 23 of the inlay 3.

The sleeve shaft 1 and the inlay 3 are arranged in a coaxial manner. The inlay 3 may be connected with the sleeve shaft 1 in a welded manner, although other types of connections are possible as well.

Figure 2:
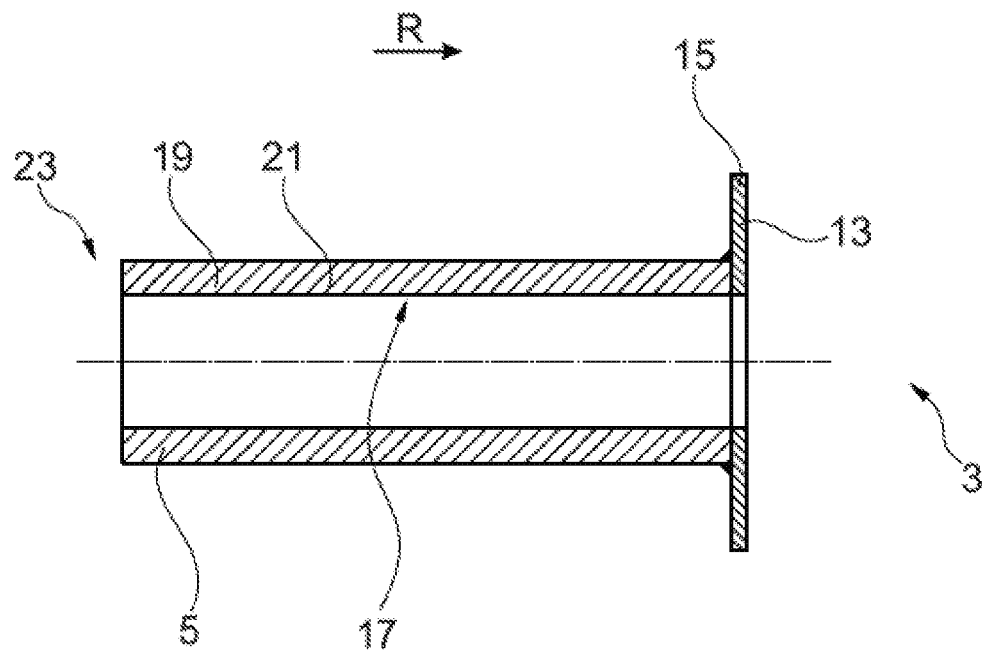
FIG. 2 illustrates a cross-sectional view of the inlay of FIG. 1 alone.

FIG. 2 shows a cross-sectional view of the inlay 3 alone. The inlay 3 can be inserted into the sleeve shaft 1 as described previously with respect to FIG. 1.

Figure 3:
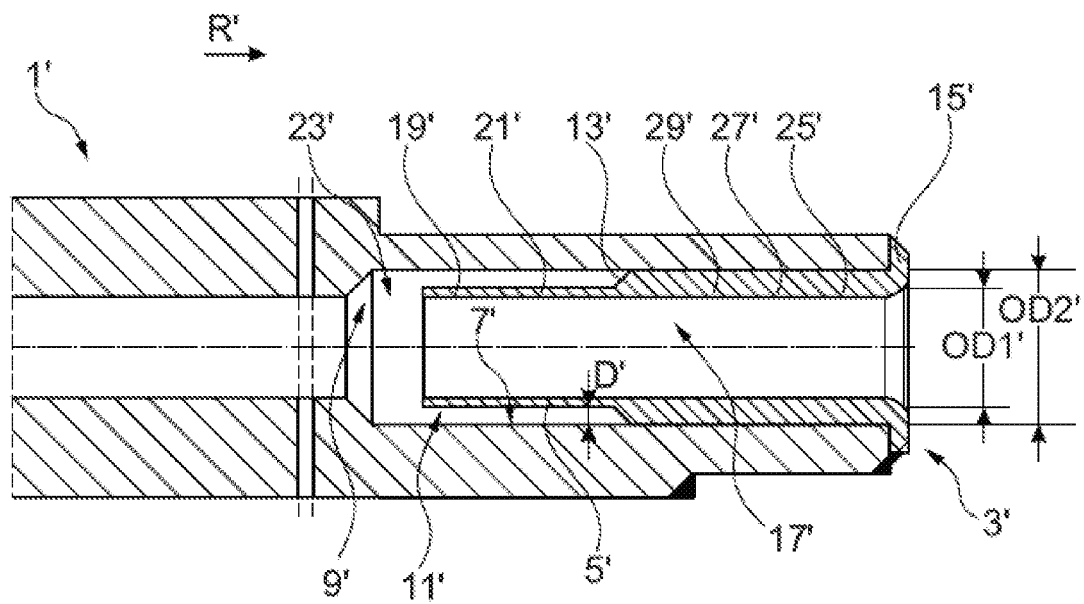
FIG. 3 illustrates a cross-sectional view of another exemplary embodiment of a sleeve shaft with an inlay provided according to the present invention.

FIG. 3 shows a cross-sectional view of another exemplary embodiment of a sleeve shaft 1' with an inlay 3' provided according to the present invention for collecting particles originating from the material of the sleeve shaft 1' at least in part.

Indeed, sleeve shaft 1' and inlay 3' are both similar to, respectively, sleeve shaft 1 and inlay 3 described previously with respect to FIG. 1 and FIG. 2. Hence, for the same structural features the same reference numerals are used, however, single apostrophed. It is, therefore, also sufficient to describe only the differences between sleeve shaft 1'/inlay 3' and sleeve shaft 1/inlay 3 while for the remainder reference can be made to the description provided previously with respect to sleeve shaft 1/inlay 3 in combination with FIG. 1 and FIG. 2.

Contrary to inlay 3, here, for inlay 3' the stop element 15' is not designed in one piece with the limiting element 13'. Moreover, the stop element 15' is separate from the limiting element 13' and provided at an end section of the inlay 3' which is opposite the first wall section 5'.

It is apparent from FIG. 3 that for the inlay 3' (in contrast to inlay 3 described previously) there is also a second shell 25' of at least one second section 27' of the cylindrical zone 17', which is different to the first section 21' of the cylindrical zone 17'. The second shell 25' comprises a second wall section 29', wherein the first outer diameter OD1' of the first wall section 5' is smaller than the second outer diameter OD2' of the second wall section 29'. In FIG. 3 the second section 27' is identical to the second wall section 27'.

The second wall section 27' contacts at least one area of the inner surface 9' of the sleeve 1'.

Figure 4:
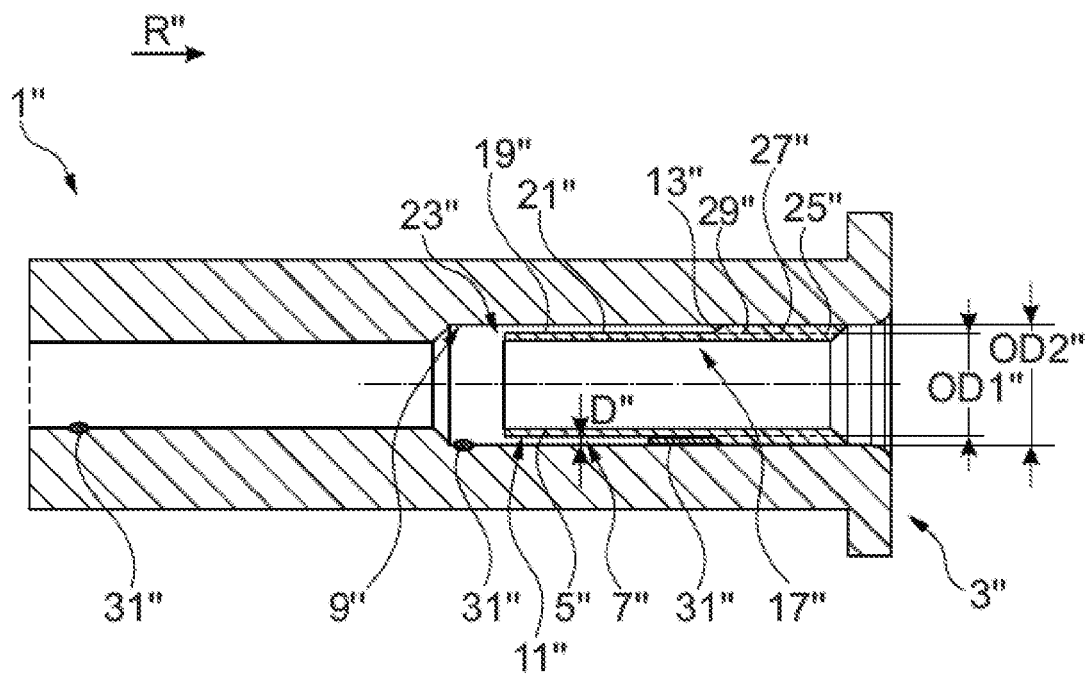
FIG. 4 illustrates a cross-sectional view of another exemplary embodiment of a sleeve shaft with an inlay provided according to the present invention.

FIG. 4 shows a cross-sectional view of another exemplary embodiment of a sleeve shaft 1'' with an inlay 3'' provided according to the present invention for collecting particles originating from the material of the sleeve shaft 1'' at least in part.

Indeed, sleeve shaft 1'' and inlay 3'' are both similar to, respectively, sleeve shaft 1' and inlay 3' described above with respect to FIG. 3. Hence, for the same structural features the same reference numerals are used, however, doubled apostrophed. It is, therefore, also sufficient to describe only the differences between sleeve shaft 1''/inlay 3'' and sleeve shaft 1'/inlay 3' while for the remainder reference can be made to the description provided previously with respect to sleeve shaft 1'/inlay 3' in combination with FIG. 3.

Contrary to inlay 3', here, for inlay 3'' there is no stop element comprised by the inlay 3''. The second section 27'' comprises a second end section of the inlay 3'', wherein the second section 27'' follows after the first section 21'' along the axial direction. Indeed, the second end section of the inlay 3'' is at the opposite end of the inlay 3'' than the first end section 23'' of the inlay 3''. The inlay 3'' is entirely within the sleeve shaft 1'', but this is not mandatory in general.

In FIG. 4 particles 31'' which move along the inner surface 9'' of the sleeve shaft 1'' or which are already trapped in the volume domain 11'' are indicated for illustration purposes.

Figure 5:
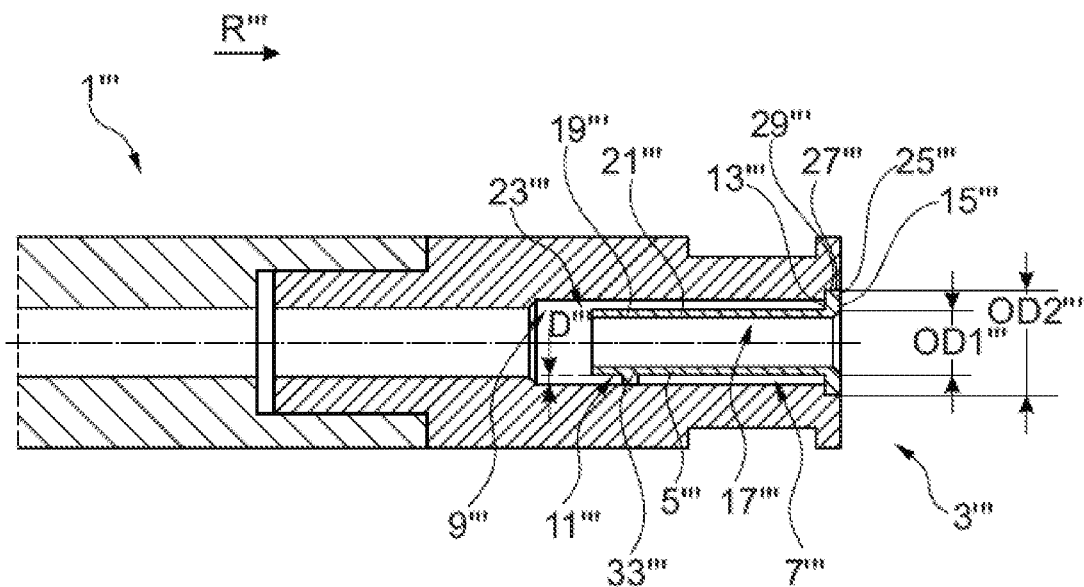
FIG. 5 illustrates a cross-sectional view of another exemplary embodiment of a sleeve shaft with an inlay provided according to the present invention.

FIG. 5 shows a cross-sectional view of another exemplary embodiment of a sleeve shaft 1''' with an inlay 3''' provided according to the present invention for collecting particles originating from the material of the sleeve shaft 1''' at least in part.

Indeed, sleeve shaft 1''' and inlay 3''' are both similar to, respectively, sleeve shaft 1' and inlay 3' described previously with respect to FIG. 3. Hence, for the same structural features the same reference numerals are used, however, three times apostrophed. It is, therefore, also sufficient to describe only the differences between sleeve shaft 1'''/inlay 3''' and sleeve shaft 1'/inlays 3' while for the remainder reference can be made to the description provided previously with respect to sleeve shaft 1'/inlay 3' in combination with FIG. 3.

Contrary to inlay 3', here, for inlay 3' the stop element 15''' is designed in one piece with the second wall section 27'''. Inlay 3''' further comprises a distant element 33''' for securely arranging the inlay at the sleeve shaft 1'''.

Figure 6:
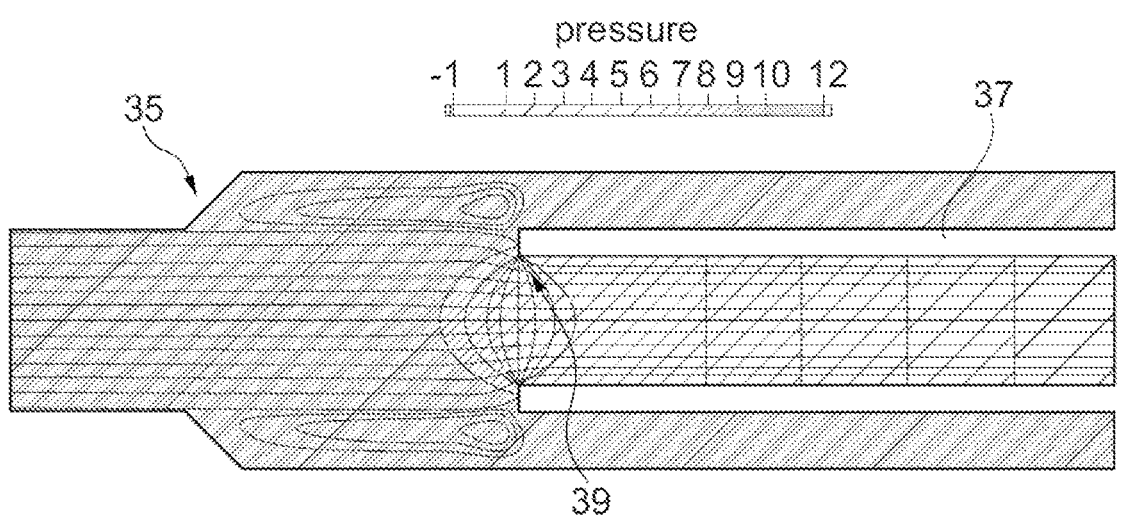
FIG. 6 illustrates a simulated pressure distribution and streamlines of the fluid flow, respectively, of a fluid flowing within a sleeve shaft with an inserted inlay provided according to the present invention.

FIG. 6 shows the simulated pressure distribution and streamlines of the fluid flow, respectively, of a fluid flowing within a sleeve shaft 35 with an inserted inlay 37 provided according to an exemplary embodiment of the present invention. The pressure distribution is indicated by respective shapes (hatches) and the streamlines of the fluid flow are indicated by respective lines within the sleeve shaft of FIG. 6.

For the sleeve shaft with inserted inlay in FIG. 6, there is apparent the advantageous distribution of the pressure. Especially at position 39, i.e., close to the inner surface of the inlay 37 at its end, there is a positive pressure. This leads to a smooth fluid flow from the larger volume enclosed by the sleeve shaft 35 to the smaller volume enclosed by the inlay 37. The smooth fluid flow is also indicated by respective smooth streamlines. Especially the streamlines have no interruption in this transition area from larger to smaller volume. Consequently, avoiding a negative pressure at position 39 improves fluid flow.

The sleeve shaft 35 and the inlay 37 are designed in line with the proposed geometric properties in order to achieve the advantageous pressure distribution and fluid flow.

Figure 7A:
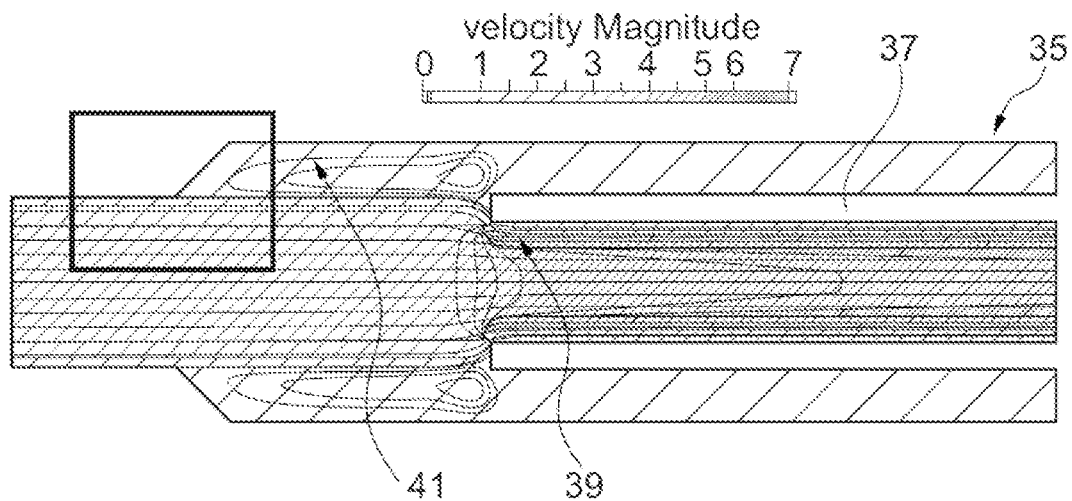
FIG. 7A illustrates a simulated magnitude velocity of a fluid flow within a sleeve shaft with an inserted inlay provided according to the present invention.

FIG. 7A shows the simulated magnitude velocity of the fluid flow within a sleeve shaft 35 with an inserted inlay 37 provided according to an exemplary embodiment provided according to the present invention. The velocity magnitude is indicated by respective shapes (hatches). Furthermore, also the streamlines of the fluid flow are indicated by respective lines within the sleeve shaft 35.

Since the sleeve shaft and inlay are similar in FIG. 6 and FIG. 7A, the same reference numerals have been used.

Also for the sleeve shaft 35 and inlay 37 in FIG. 7A, the advantageous positive pressure at position 39 and the smooth streamlines are present. In addition, close to the inner surface 41 of the sleeve shaft 35 the absolute velocity of the fluid is quite small. Hence, there is the improved chance that the particles which are already close to the inner surface 41 get actually trapped within the volume enclosed between the sleeve shaft 35 and the inlay 37.

Figure 7B:
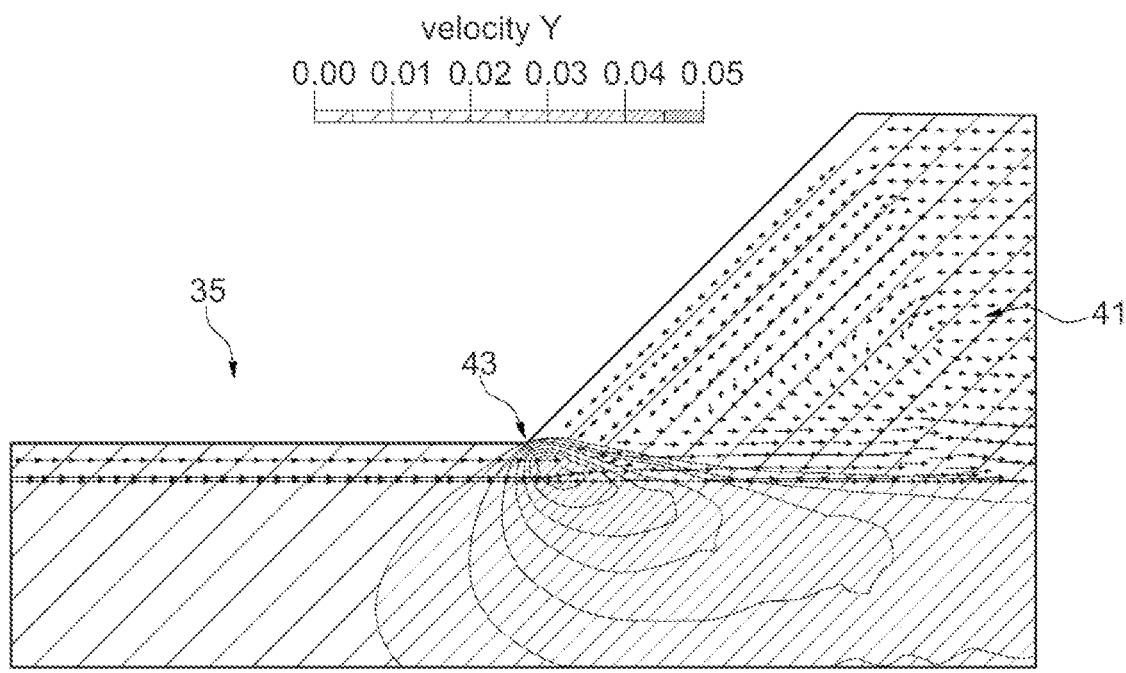
FIG. 7B illustrates a detailed view of an area in FIG. 7A for the radial velocity of the fluid flowing within the sleeve shaft.

FIG. 7B shows a detail view of the area indicated with a rectangle in FIG. 7A. In FIG. 7B the radial velocity of the fluid flowing within the sleeve shaft is indicated by respective shapes (hatches). At the corner 43, a high radial velocity is present which supports that particles reach the volume enclosed between sleeve shaft 35 and the inlay 37, where they get trapped.

It therefore may be provided that the inner diameter of the sleeve shaft 35 has an increasing inner diameter from left to right in FIGS. 7A and 7B.

Hence, the simulations shown in FIGS. 6, 7A, and 7B illustrate that the sleeve shaft with inlay provided according to the present invention may provide positive pressure at the end of the inlay and/or increase the time the particles have in order to get trapped.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

| List of reference numerals | |
|---|---|
| 1, 1', 1'', 1''' | Sleeve shaft |
| 3, 3', 3'', 3''' | Inlay |
| 5, 5', 5'', 5''' | First wall section |
| 7, 7', 7'', 7''' | First area |
| 9, 9', 9'', 9''' | Inner surface |
| 11, 11', 11'', 11''' | Volume domain |
| 13, 13', 13'', 13''' | Limiting element |
| 15, 15', 15''' | Stop element |
| 17, 17', 17'', 17''' | Zone |
| 19, 19', 19'', 19''' | First Shell |
| 21, 21', 21'', 21''' | First section |
| 23, 23', 23'', 23''' | First end section |
| 25', 25'', 25''' | Second Shell |
| 27', 27'', 27''' | Second section |
| 29', 29'', 29''' | Second wall section |
| 31'' | Particles |
| 33'' | Element |
| 35 | Sleeve shaft |
| 37 | Inlay |
| 39 | Position |
| 41 | Surface |
| 43 | Corner |
| R, R', R'', R''' | Direction |
| D, D', D'', D''' | Distance |
| OD1', OD1'', OD1''' | First outer diameter |
| OD2', OD2'', OD2''' | Second outer diameter |

What is claimed is:

1. An inlay for a sleeve shaft for collecting particles originating from a material of the sleeve shaft at least in part, at least one fluid being flowable through the sleeve shaft along an axial direction which is parallel to a main extension of the sleeve shaft, the inlay comprising at least one first wall section and the inlay is inserted or insertable at least in part into the sleeve shaft such that at least one part of the first wall section has a radial distance from at least one first area of an inner surface of the sleeve shaft, and, hence, that the inlay together with the first area of the inner surface of the sleeve shaft encloses at least one volume domain, which volume domain is limited in the axial direction by a limiting element comprised by the inlay, wherein the inlay comprises at least one zone of cylindrical form, and a first shell of at least one first section of the cylindrical zone comprises the first wall section, wherein the first section comprises at least one first end section of the inlay, wherein the cylindrical zone has at least one second section, which is different to the first section of the cylindrical zone, with a second shell comprising at least one second wall section, wherein a first outer diameter of the first wall section is smaller than a second outer diameter of the at least one second wall section, the at least one second section comprising at least one second end section of the inlay.

2. The inlay of claim 1, wherein the particles, which are moving at least in part mediated by at least one of a fluid flow or gravity along the inner surface of the sleeve shaft along the axial direction, reach the volume domain and get trapped, hence, are prevented from moving further along the axial direction.

3. The inlay of claim 1, wherein
the second section follows after the first section along the axial direction.

4. The inlay of claim 1, wherein the limiting element is formed by at least one transition from the first wall section to the second wall section.

5. The inlay of claim 4, wherein the transition is designed in at least one cross sectional plane at least one of in the form of at least one step or in the form of at least one arc segment.

6. The inlay of claim 1, wherein the limiting element is at least one of formed or arranged in at least one end section of the first wall section.

7. The inlay of claim 6, wherein at least one of the following is fulfilled:
the limiting element is in one piece with the first wall section; or
the end section of the first wall section is facing away from the at least one first end section of the inlay.

8. The inlay of claim 1, wherein the inlay comprises at least one stop element and the at least one stop element is at least one of:
designed in the form of at least one collar;
designed at least in part in one piece with the limiting element;
designed at least in part in one piece with the second wall section; or
provided in at least one end section of the inlay.

9. The inlay of claim 1, wherein the inlay comprises at least one of:
at least one fastener for arranging the inlay at the sleeve shaft;
at least one distant element; or
at least one stop element.

10. The inlay of claim 1, wherein at least one of the following is fulfilled:
the inlay is connected or connectable with the sleeve shaft by at least one of welding, in a positive locking manner, or in a frictional locking manner; or
the volume domain is at least in part in the form of at least one ring volume.

11. The inlay of claim 1, wherein the particles comprise at least one of oxidation products of material of the sleeve shaft, cinder particles or corrosion particles.

12. The inlay of claim 11, wherein the particles are created by the reaction of steel together with oxygen at temperatures of between 1000 to 1500 degrees C.

13. The inlay of claim 1, wherein the inlay is configured to at least one of not substantially affect the fluid flow within the sleeve shaft negatively or not substantially affect the shape, the quality or the geometric properties of a produced glass tube strand.

14. A sleeve shaft, comprising:
at least one inlay for collecting particles originating from material of the sleeve shaft at least in part, wherein at least one fluid is flowable through the sleeve shaft along an axial direction which is parallel to a main extension of the sleeve shaft, the at least one inlay comprising at least one first wall section and the at least one inlay is inserted at least in part into the sleeve shaft such that at least one part of the first wall section has a radial distance from at least one first area of an inner surface of the sleeve shaft, and, hence, that the at least one inlay together with the first area of the inner surface of the sleeve shaft encloses at least one volume domain, which volume domain is limited in the axial direction by a limiting element comprised by the at least one inlay, wherein the at least one inlay comprises at least one zone of cylindrical form, and a first shell of at least one first section of the cylindrical zone comprises the first wall section, wherein the first section comprises at least one first end section of the at least one inlay, wherein the cylindrical zone has at least one second section, which is different to the first section of the cylindrical zone, with a second shell comprising at least one second wall section, wherein a first outer diameter of the first wall section is smaller than a second outer diameter of the at least one second wall section, the at least one second section comprising at least one second end section of the at least one inlay.

15. The sleeve shaft of claim 14, wherein the sleeve shaft and the at least one inlay are arranged in a coaxial manner.

16. The sleeve shaft of claim 14, wherein the sleeve shaft comprises at least one of steel, chromium-nickel steel, or 2.4633 steel as material.

17. A refractory tube for use in a glass tube drawing process, the refractory tube comprising:
- at least one outer surface comprising at least one of platinum or at least one platinum alloy; and
- a sleeve shaft inserted into the refractory tube, the sleeve shaft comprising at least one inlay for collecting particles originating from material of the sleeve shaft at least in part, wherein at least one fluid is flowable through the sleeve shaft along an axial direction which is parallel to a main extension of the sleeve shaft, the at least one inlay comprising at least one first wall section and the at least one inlay is inserted at least in part into the sleeve shaft such that at least one part of the first wall section has a radial distance from at least one first area of an inner surface of the sleeve shaft, and, hence, that the at least one inlay together with the first area of the inner surface of the sleeve shaft encloses at least one volume domain, which volume domain is limited in the axial direction by a limiting element comprised by the at least one inlay, wherein the at least one inlay comprises at least one zone of cylindrical form, and a first shell of at least one first section of the cylindrical zone comprises the first wall section, wherein the first section comprises at least one first end section of the at least one inlay, wherein the cylindrical zone has at least one second section, which is different to the first section of the cylindrical zone, with a second shell comprising at least one second wall section, wherein a first outer diameter of the first wall section is smaller than a second outer diameter of the at least one second wall section, the at least one second section comprising at least one second end section of the at least one inlay.

18. The refractory tube of claim 17, further comprising a shell comprising an axial extension, wherein a total axial length L of the at least one inlay, a heat resistance parameter γ of at least parts of a material of the at least one inlay and an axial distance d between a position where molten glass runs onto the refractory tube and an end of the refractory tube, from which end a glass tube is drawn, meet the condition: L<15 γd, wherein the heat resistance parameter γ is defined as $$\gamma = 1 - \frac{E(300°\ C.) - E(1300°\ C.)}{E(300°\ C.)}$$

with E(T) being the Young's modulus of a metal material comprised by the at least one inlay at temperature T, and wherein the position where molten glass runs onto the refractory tube is defined as a center of the axial extension of the shell.

* * * * *

UNITED STATES PATENT AND TRADEMARK OFFICE
CERTIFICATE OF CORRECTION

| | | |
|---|---|---|
| PATENT NO. | : 11,820,692 B2 | Page 1 of 1 |
| APPLICATION NO. | : 17/334893 | |
| DATED | : November 21, 2023 | |
| INVENTOR(S) | : Trinks | |

It is certified that error appears in the above-identified patent and that said Letters Patent is hereby corrected as shown below:

In the Specification

Column 8
At Line 42, please delete "parameter y", and substitute therefore --parameter $\gamma$--.

Column 9
At Line 2, please delete "L≤2γd'", and substitute therefore --L≤3γd--.

Signed and Sealed this
Twenty-seventh Day of January, 2026

John A. Squires
*Director of the United States Patent and Trademark Office*